US005938754A

United States Patent [19]

Edwards et al.

[11] Patent Number: 5,938,754

[45] Date of Patent: Aug. 17, 1999

[54] FIELDBUS CONNECTOR INCLUDING DUAL CONNECTORS

[75] Inventors: James W. Edwards, Austin; William R. Pitts, Round Rock; Michael S. Butler, Austin, all of Tex.

[73] Assignee: National Instruments Corporation, Austin, Tex.

[21] Appl. No.: 08/979,968

[22] Filed: Nov. 26, 1997

[51] Int. Cl.[6] .......... G06F 13/00

[52] U.S. Cl. .......... 710/129; 714/27

[58] Field of Search .......... 395/183.03, 183.21, 395/200.54, 280, 306, 309; 439/255; 714/27, 45; 710/100, 126, 129; 709/224

[56] References Cited

U.S. PATENT DOCUMENTS

| | | | |
|---|---|---|---|
| 4,829,244 | 5/1989 | Tom et al. | 324/158 F |
| 5,775,955 | 7/1998 | Graube et al. | 439/717 |

OTHER PUBLICATIONS

Product information "PCMCIA Interface Card" DeviceNet, 1998, Open DeviceNet Vendor Association, Inc., pp. 23, 1 sheet.

Product information PCMCIA interface Card: 5136–DN–PCM Direct–Link adapter for DeviceNet, 1991, 1 sheet.

Product Preview "Interface card provides ISADeviceNet link," Control Engineering, Jul. 1995, pp. 99, 1 sheet.

Instrumentation Reference and Catalogue 1997: Test Measurement and Industrial Automation, pp. 6–39 6–42.

Application Controller CAN–AC1/AC2 Data Sheet, originally printed from "Softing" website May 28, 1997 (2 sheets).

PCI Process Control Interface pp. 12, from "Softing" brochure dated Sep. 1995.

CAN–PCMICIA: PCMCIA Interface Product information from "CAN Solutions '97" at http://www/actia.com.

ICT data sheet for Foundation Fieldbus H1 interface, from "Softing" brochure dated Jan. 1995 (2 sheets).

*Primary Examiner*—Glenn A. Auve

*Attorney, Agent, or Firm*—Conley, Rose & Tayon; Jeffrey C. Hood; Georgious Georgakis

[57] ABSTRACT

An improved dual-connector cable for connecting a computer to a serial instrumentation bus. In one embodiment, the serial instrumentation bus is a fieldbus, preferably either a Foundation fieldbus or a Controller Area Network (CAN) bus. The cable comprises a first terminal located at a first end of the cable for coupling the cable to the computer. The first terminal comprises a device connector which is configured to connect the first terminal to a connector on the computer. The cable also comprises a second terminal located at a second end of the cable for coupling the cable to the serial instrumentation bus. The second terminal comprises interface circuitry for interfacing the cable with the serial instrumentation bus. The second terminal further comprises a first bus connector that is electrically coupled to the serial instrumentation interface circuitry. The first bus connector is configured to connect to a mating connector for coupling to the serial instrumentation bus. The second terminal further comprises a second bus connector that is electrically coupled to the serial instrumentation interface circuitry. The second bus connector is configured to connect to the serial instrumentation bus. In one embodiment, the first bus connector is operable to be connected to the serial instrumentation bus and the second bus connector is operable to be connected to a bus monitor to enable the bus monitor to monitor signals on the serial instrumentation bus.

22 Claims, 11 Drawing Sheets

FIELDBUS CONNECTOR INCLUDING DUAL CONNECTORS

FIELD OF THE INVENTION

The present invention relates to a cable and connectors for connecting a device to a serial instrumentation data bus.

DESCRIPTION OF THE RELATED ART

A fieldbus is a specific type of local area network (LAN) that is used to monitor or control one or more pieces of production equipment. The term "fieldbus" generally refers to an all-digital, two-way communication system that connects control systems to instrumentation. A fieldbus network comprises a plurality of digital devices and control/monitoring equipment that are integrated to provide I/O and control for automated processes. A fieldbus network is typically used in industrial and/or process control applications, such as a factory or a manufacturing plant. The physical devices in a fieldbus system are connected by the fieldbus. One example of a fieldbus network is the Foundation Fieldbus network.

Foundation fieldbus, which is the serial communications network created by the Fieldbus Foundation, specifically targets the need for robust distributed control in process control environments. Devices connected by a Foundation fieldbus exchange data between themselves, and thus control a fieldbus process. Devices are given the opportunity to communicate data by a token passing scheme controlled by a device referred to as the "Link Active Scheduler" or LAS (a device used to schedule communication traffic).

The components of a Foundation Fieldbus Network include the following:

1. Link
2. Devices
3. Blocks and Parameters
4. Linkages
5. Loops
6. Schedule

Fieldbus networks may contain one of four types of devices, these being temporary devices, field devices, interface devices, and monitor devices. Temporary devices are devices attached to one of four network addresses reserved for temporary or visitor use. Temporary devices are typically used for configuration and troubleshooting. Field devices are devices that typically comprise function block application processes or, in other words, devices that perform the I/O and control that automates the plant or factory. All field devices are given a permanent address by the system manager when they are attached to the network. Interface devices perform data display and other interface functions for field devices. Like field devices, interface devices are assigned a permanent address, but interface devices do not necessarily contain function block application processes. Finally, monitor devices are devices that are able to listen to network traffic but are not permitted to transmit onto the network. Monitor devices receive no address when attached to the network, and the other network devices are unaware of the monitor's presence.

A field device generally comprises one or more different types of blocks, including function blocks, resource blocks, and transducer blocks. A function block comprises an algorithm and one or more parameters associated with the algorithm. Function blocks model field device functions, such as analog input (AI) functions and PID (Proportional Integral Derivative) control loop functions, among others.

The function block model provides a common structure for defining function block inputs, outputs, algorithms and control parameters. This structure simplifies the identification and standardization of characteristics that are common to function blocks. A collection of one or more function blocks is referred to as a virtual field device (VFD).

The Controller Area Network (CAN) is a serial fieldbus growing in popularity as a device-level network. CAN was originally developed to address the needs of in-vehicle automotive communications. Automobiles include a variety of control devices, for such functions as engine timing, carburetor throttle control, and antilock brake systems. With increasing demands placed upon these systems for safety, performance, and customer needs, CAN was developed to provide a digital serial bus system to connect controllers. CAN has been standardized internationally (ISO DIS 11898 and ISO DIS 11519-2) and is currently available in a number of silicon implementations. The CAN protocol meets real-time requirements encountered in many automotive applications. The network protocol can detect and correct transmission errors caused by electromagnetic interference. Also, the network itself is relatively easy to configure and offers the ability to perform centralized diagnostics.

Comparison of automotive and industrial network requirements show that a number of characteristics of CAN also make it suitable for industrial applications. These characteristics include low cost, suitability for harsh electrical environments, good real-time capabilities, and ease of configuration. There are now many examples of CAN being the basis for networks used in industrial manufacturing applications. CAN is particularly well-suited to networking smart I/O devices, as well as sensors and actuators, either in a single machine or in a plant. Several industrial device bus systems have been built upon CAN. Allen-Bradley developed DeviceNet, a CAN-based protocol now maintained by the Open DeviceNet Vendor's Association. Other such industrial networks include CANopen, developed by CAN in Automation (CiA) and the Smart Distributed System (SDS), developed by Honeywell Microswitch.

CAN is a communications protocol specification that defines parts of the OSI Physical and Data Link Layers. CAN does not specify the entire Physical Layer or the Medium upon which it resides, or the Application Layer protocol used to move data. Listed below are some key technical aspects of CAN.

1. Typical data rates are 125 kb/s to 1 Mb/s, dependent upon the distance over which the network is operating. The allowable distance ranges from 40 m at 1 Mb/s to 500 m at 125 kb/s to a km at 10 kb/s.

2. CAN communications are performed in a unit called a frame. CAN frames can contain up to 8 bytes of data.

3. CAN provides extensive error correction, including bit monitoring (comparing transmitted bits to received), bit stuffing, CRC checksum, acknowledgment by all receivers, frame check (verify length), automatic retry, and fault confinement (defective devices automatically shut off).

4. Access to CAN network is controlled using a method called nondestructive bitwise arbitration. In this system, when a CAN node wants to send a frame, it waits for the bus to become idle, then starts its frame with an arbitration identifier (ID). Because of the underlying physical layer, a dominant bit (0) always overrides any recessive bit (1). As a node is writing its bits to the bus, it also reads the bus to determine if the bit on the bus is different than the bit written by the node. If the bits are different, the node stops its write because some other node has higher priority to the bus. Thus, the arbitration ID determines the priority of messages on the bus, with lower IDs having higher priority.

The industrial protocols built upon CAN add further specifications in such areas as wiring types, connectors, diagnostics indicators, configuration switches, and hot-swapping capability. Of great importance with such networks is the definition of objects for organizing data within devices as well as for defining classes of devices, such as switches, motor starters, and I/O systems. These higher-level software definitions add the ease of use and standardization to enable CAN's widespread use in industrial automation applications.

When making cables/connectors for connecting to a CAN fieldbus, it is necessary to consider the type of industrial protocol (application layer specification) that the specific CAN bus uses. Different industrial protocols, including DeviceNet, CANopen, and SDS, specify their own type of cable and connector for connecting a device to the CAN bus. Furthermore, each industrial CAN protocol requires specific circuitry inside each cable for connecting a device to the CAN bus of that particular protocol. It would thus be desirable to have a cable with multiple connectors corresponding to the connectors required by each of the different industrial protocols for a CAN bus. It would further be desirable to have a cable containing circuitry that is compliant with all of the different industrial protocols.

In certain cases, there is only a limited number of connectors available for connecting devices to a fieldbus. And in some of those cases, the number of devices required to be connected to the bus exceeds the number of available connectors. It would thus be desirable to have a cable with a terminal that allows more than a single device to connect to the fieldbus. Furthermore, it would be desirable to have a cable comprising more than one type of connector for interfacing to the fieldbus, thus providing the user with more flexibility for interfacing a device to the fieldbus.

SUMMARY OF THE INVENTION

The present invention comprises an improved dual-connector cable for connecting a computer to a serial instrumentation bus. In one embodiment, the serial instrumentation bus is a fieldbus, such as the Foundation fieldbus or the Controller Area Network (CAN) bus.

The cable comprises a first terminal located at a first end of the cable for coupling the cable to the computer. The first terminal comprises a device connector which is configured to connect the first terminal to a connector on the computer. In the preferred embodiment, the device connector is adapted for connecting to a PC card of a portable computer.

The cable also comprises a second terminal located at a second end of the cable for coupling the cable to the serial instrumentation bus. The second terminal comprises interface circuitry for interfacing the cable with the serial instrumentation bus, e.g., the fieldbus. If the serial instrumentation bus is a CAN bus, the second terminal comprises CAN interface circuitry. If the serial instrumentation bus is a Foundation fieldbus, the second terminal comprises Foundation fieldbus interface circuitry. In one embodiment, the circuitry comprises optical isolators for providing signal isolation to the computer system. The optical isolators provide spike protection from the computer to the serial instrumentation bus and from the serial instrumentation bus to the computer.

The second terminal further comprises a first bus connector that is electrically coupled to the serial instrumentation interface circuitry. In the preferred embodiment, the first bus connector is a 9-pin D-Sub connector. The first bus connector is configured to connect to a mating connector for coupling to the serial instrumentation bus. The second terminal further comprises a second bus connector that is electrically coupled to the serial instrumentation interface circuitry. In the preferred embodiment, the second bus connector is a 5-position pluggable screw terminal connector. The second bus connector is configured to connect to the serial instrumentation bus. The first bus connector includes a first plurality of signal connectors, and the second bus connector includes a second plurality of signal connectors. The second plurality of signal connectors is electrically coupled to corresponding ones of the first plurality of signal connectors. In an embodiment where the serial instrumentation bus is a CAN bus, the first bus connector is useable for a first type of CAN bus, and the second bus connector is useable for a second type of CAN bus. Different types of CAN bus include: DeviceNet, CANopen, and SDS.

In one embodiment, the first bus connector is operable to be connected to the serial instrumentation bus and the second bus connector is operable to be connected to a bus monitor to enable the bus monitor to monitor signals on the serial instrumentation bus.

Therefore, in one embodiment, the present invention comprises a dual-connector cable for connecting to a fieldbus, such as a Foundation fieldbus or CAN bus. The dual-connector cable provides two types of connectors for connecting to different industrial protocols for a fieldbus. Furthermore, the dual-connector cable contains circuitry that is compliant with various different industrial protocols.

BRIEF DESCRIPTION OF THE DRAWINGS

Other objects and advantages of the invention will become apparent upon reading the following detailed description and upon reference to the accompanying drawings in which.

Figure 1:
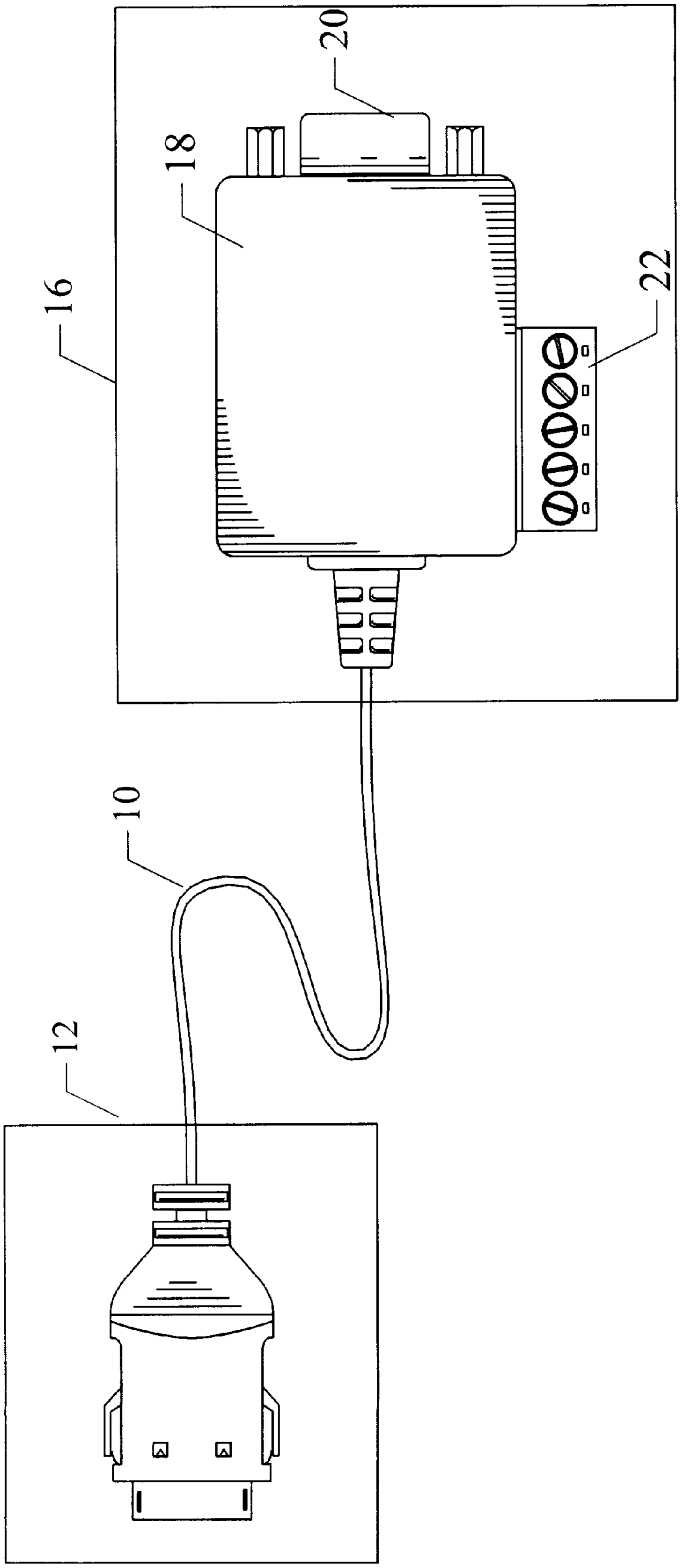
FIG. 1 shows a cable for connecting a computer to a CAN bus or a Foundation fieldbus with a dual connector cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

FIG. 1 illustrates cable 10 for connecting a computer to a serial instrumentation bus. In the preferred embodiment, the serial instrumentation bus comprises a fieldbus such as the Foundation fieldbus or the Controller Area Network (CAN) bus (or a bus based on the CAN bus, such as DeviceNet, CANopen, and SDS).

As shown, the cable comprises first terminal 12 located at a first end of the cable 10 for coupling the cable to the computer. First terminal 12 comprises device connector 14, wherein the device connector 14 is configured to connect first terminal 12 to a connector on the computer.

The cable 10 also comprises second terminal 16 located at a second end of the cable for coupling cable 10 to the serial instrumentation bus. Second terminal 16 comprises serial instrumentation bus interface circuitry located inside pod 18 for interfacing the cable 10 with the serial instrumentation bus. In a CAN bus embodiment, the serial instrumentation bus interface circuitry comprises CAN bus interface circuitry. In a Foundation fieldbus bus embodiment, the serial instrumentation bus interface circuitry comprises Foundation fieldbus interface circuitry.

Second terminal 16 also comprises first bus connector 20 that is electrically coupled to the serial instrumentation bus interface circuitry. First bus connector 20 is configured to connect to a mating connector for coupling to the serial instrumentation bus.

Second terminal 16 also comprises second bus connector 22 that is electrically coupled to the serial instrumentation bus interface circuitry and to first bus connector 20. Second bus connector 22 is also configured to connect the serial instrumentation bus.

Figure 2:
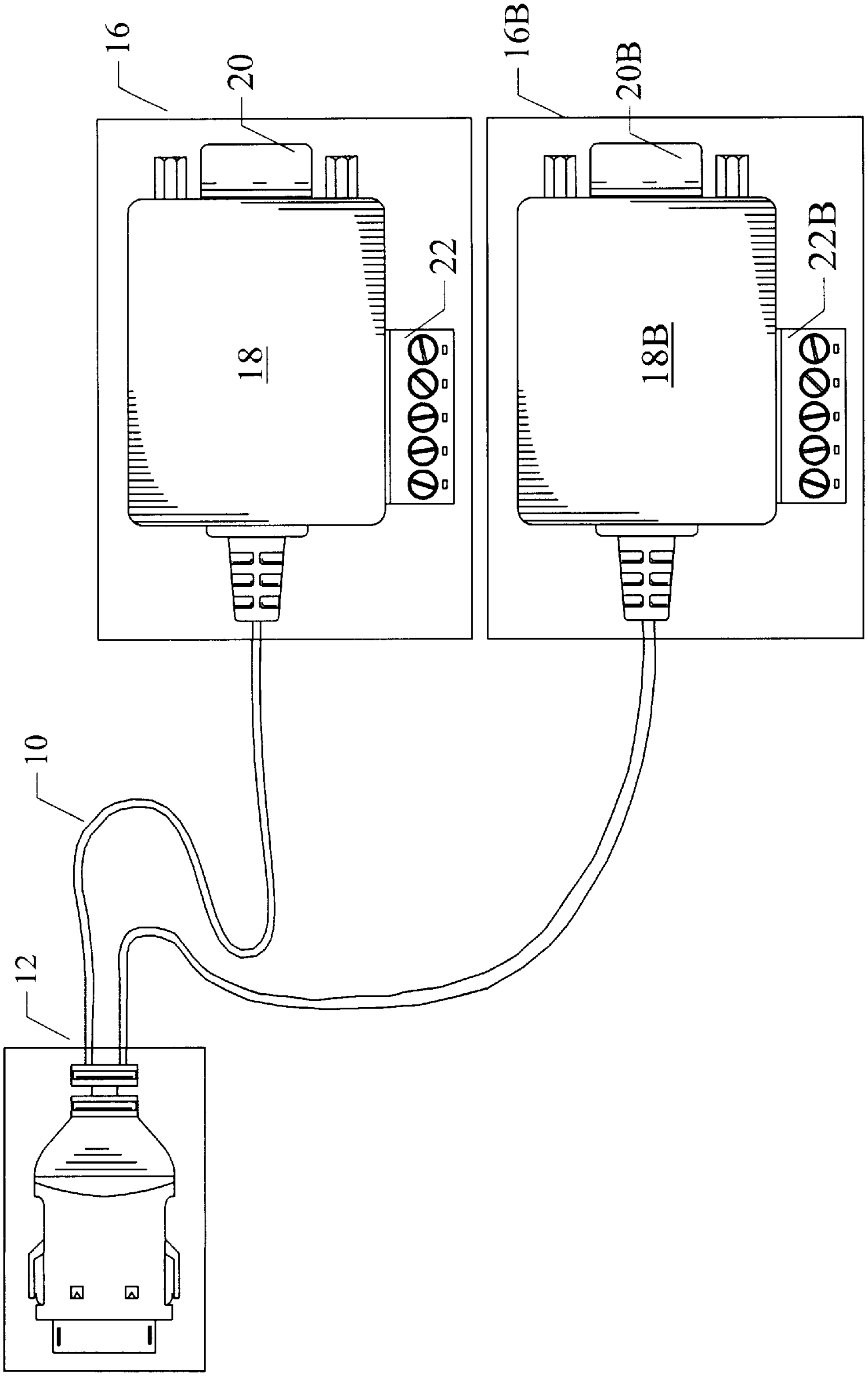
FIG. 2 shows a cable for connecting a computer to a CAN bus or Foundation fieldbus bus with two dual connector cables.

In another embodiment, two cables 10 and 10B are connected to first terminal 12. Such a dual cable is shown in FIG. 2. The dual cable comprises two second terminals 16 and 16B having two pods 18 and 18B. Each of the two pods includes a first bus connector and a second bus connector. In the preferred embodiment, both pod 18 and pod 18B contain serial instrumentation bus interface circuitry operable to interface to the same type of bus. A dual cable provides additional connecting options for connecting a computer to a serial instrumentation bus. In one embodiment, each of the pods 18 and 18B comprise serial instrumentation bus interface circuitry operable to interface to different types of buses, e.g., pod 18 includes serial instrumentation bus interface circuitry operable to interface to a first type of fieldbus, and pod 18B includes serial instrumentation bus interface circuitry operable to interface to a second type of fieldbus.

Figure 3:
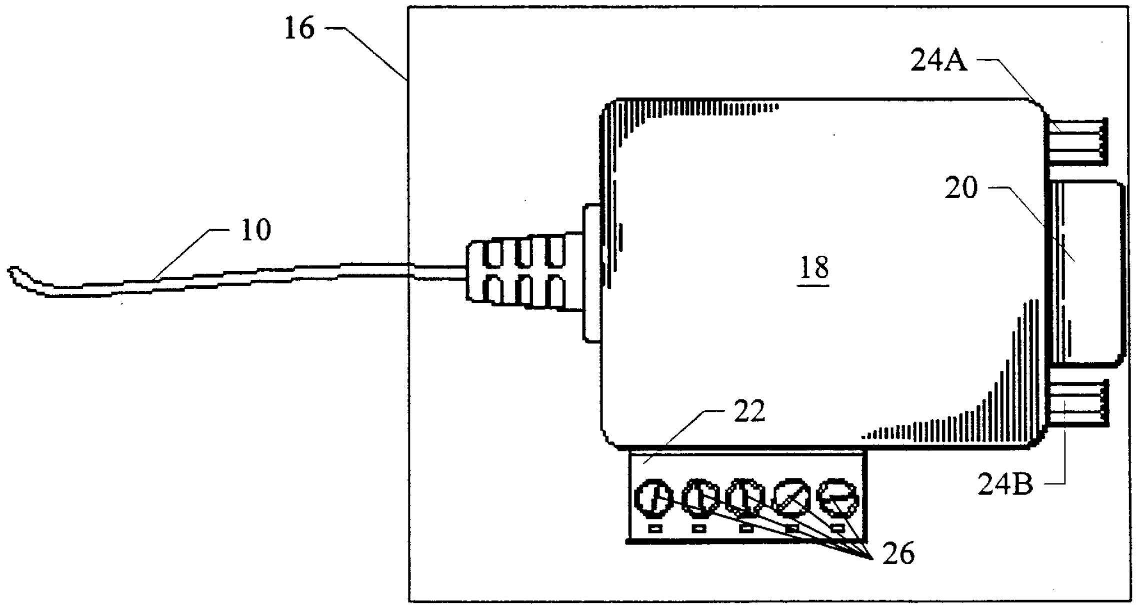
FIG. 3 shows the second terminal of a cable with a dual connector.

FIG. 3 shows second terminal 16 of cable 10. In the preferred embodiment, first bus connector 20 is a 9-pin D-sub type connector. First bus connector 20 comprises posts 24A and 24B for attaching first bus connector 20 to a mating connector on the serial instrumentation bus. Second bus connector 22 is a 5-position pluggable screw terminal connector. Second bus connector 22 comprises bolts 26 for attaching wires from the serial instrumentation bus to second bus connector 22.

Figure 4:
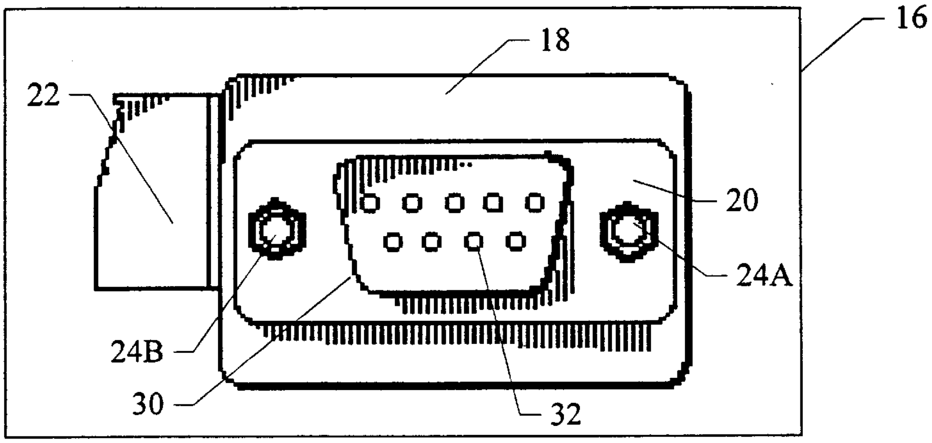
FIG. 4 shows the 9-pin D-Sub connector of the second terminal of the cable.

FIG. 4 shows a close-up view of the 9-pin D-Sub first bus connector 20. First bus connector 20 comprises posts 24A and 24B, grounding chassis 30 and pins 32. First bus connector 20 is designed to connect to a mating connector on the serial instrumentation bus. Bolts from the mating connector are designed to screw into posts 24A and 24B in order to secure the two connectors together. Chassis 30 is designed to mate with a corresponding chassis on the mating connector to provide a common ground between the bus and the cable. Pins 32 are designed to fit into corresponding receptors of the bus mating connector to provide multiple (9 in this embodiment) electrical connections between the bus and the cable.

Figure 5:
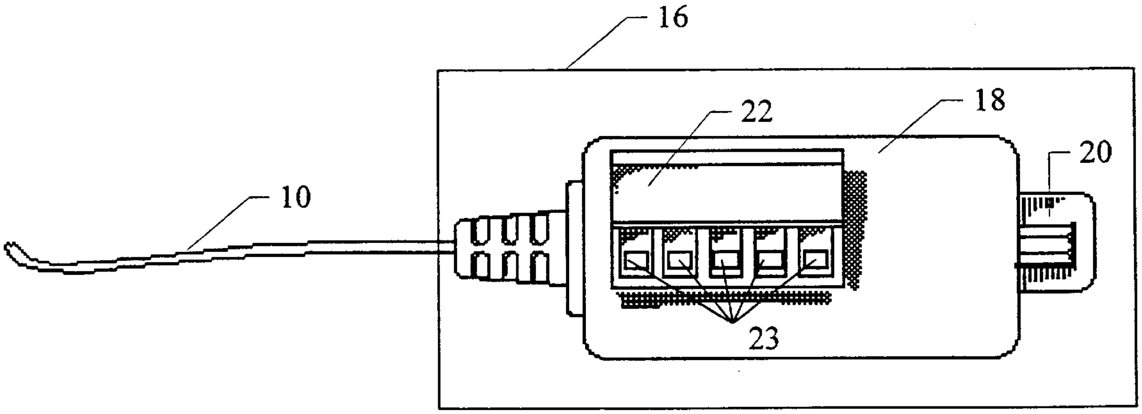
FIG. 5 shows the 5-position pluggable screw terminal connector of the second terminal of the cable.

FIG. 5 shows a close-up view of 5-position pluggable screw terminal connector or second bus connector 22. Second bus connector 22 is a 5-position pluggable screw terminal connector which enables a serial instrumentation bus without a special connector to connect to the cable. Second bus connector comprises wire receptors 23 with corresponding bolts. Five wires from the bus can be striped of their plastic cover to expose the underlying metal which can then be inserted into wire receptors 23. The wires are then attached securely by tightening bolts. Wire receptors 23 of second bus connector 22 are electrically coupled to corresponding ones of pins 32 of first bus connector 20.

Figure 6:
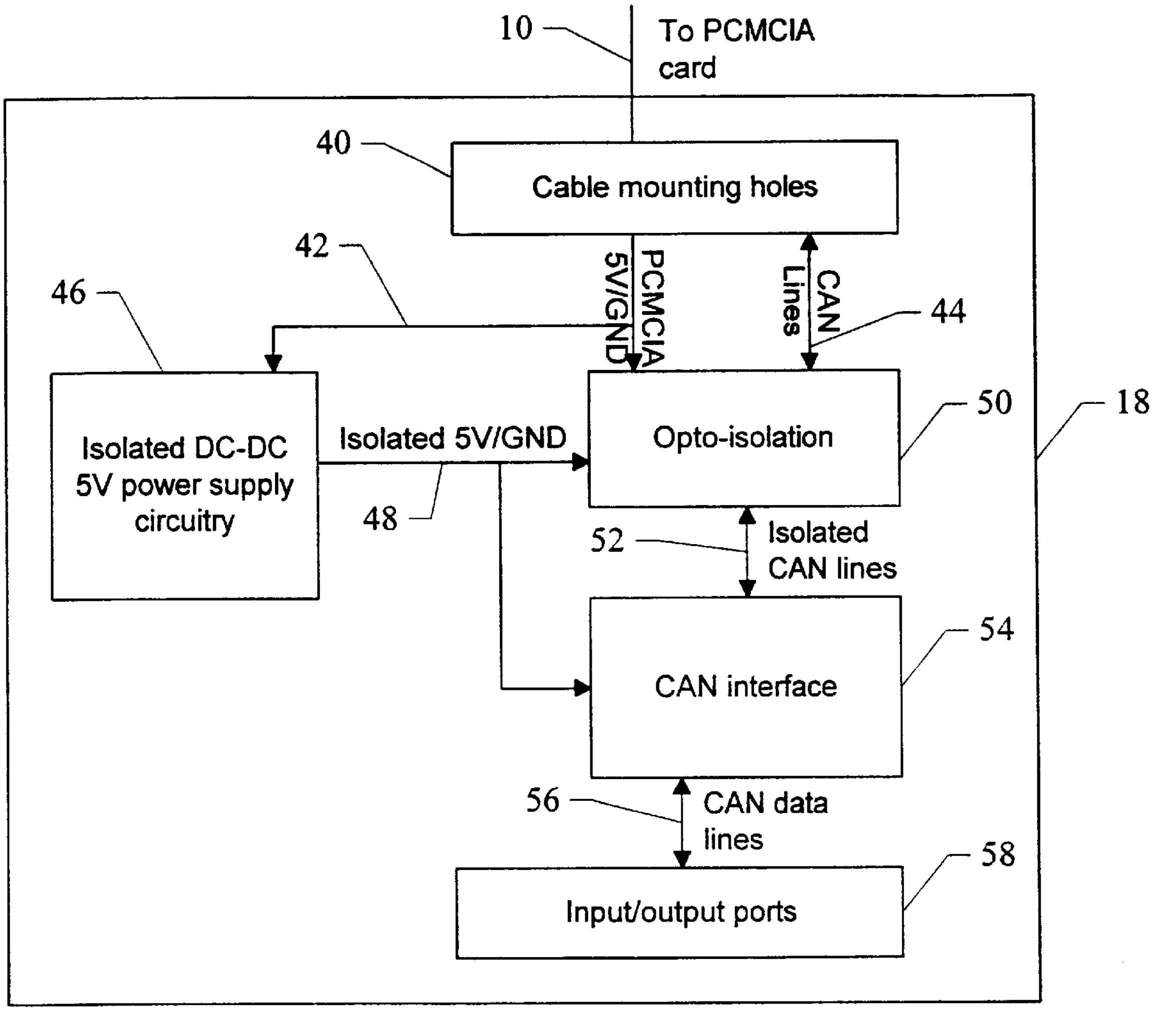
FIG. 6 shows schematic diagram of the circuitry inside the pod of a CAN bus cable which is internally powered.

FIG. 6 shows a schematic diagram of the circuitry inside pod 18 of second terminal 16. The circuitry shown here is for a CAN bus cable that is internally powered. In this embodiment, CAN interface 54 is powered by the device, e.g., the computer or interface card, that is connected to the cable. Cable 10 is connected to pod 18 using cable mounting holes 40. Cable 10 provides 5V/ground power supply 42 and CAN data lines 44. The 5V/ground power supply 42 is provided to isolated DC—DC 5V power supply circuitry 46 and to a first section of opto-isolation 50. Isolated DC—DC 5V power supply circuitry 46 provides isolated 5V/ground power supply 48 which is electrically isolated from 5V/ground power supply 42, i.e., electrical spikes present in 5V/ground power supply 42 do not propagate to isolated 5V/ground power supply 48. Isolated 5V/ground power supply 48 is also provided to a second section of opto-isolation 50.

Opto-isolation 50 receives CAN lines 44 and provides isolated CAN lines 52, which are electrically isolated from CAN lines 44. An electrical spike present in CAN lines 44 cannot propagate to isolated CAN lines 52. The operation of opto-isolation 50 is well-known in the art.

As a result of the electrical isolation, CAN interface 54 is supplied with isolated power and data lines. Thus, the serial instrumentation bus that is connected to input/output ports 58 and provided with CAN data lines 56 is electrically isolated from the device that cable 10 is connected to. Therefore, the device is protected from any electrical spikes that may occur in the serial instrumentation bus, and the serial instrumentation bus is protected from any electrical spikes that may occur in the device.

Figure 7:
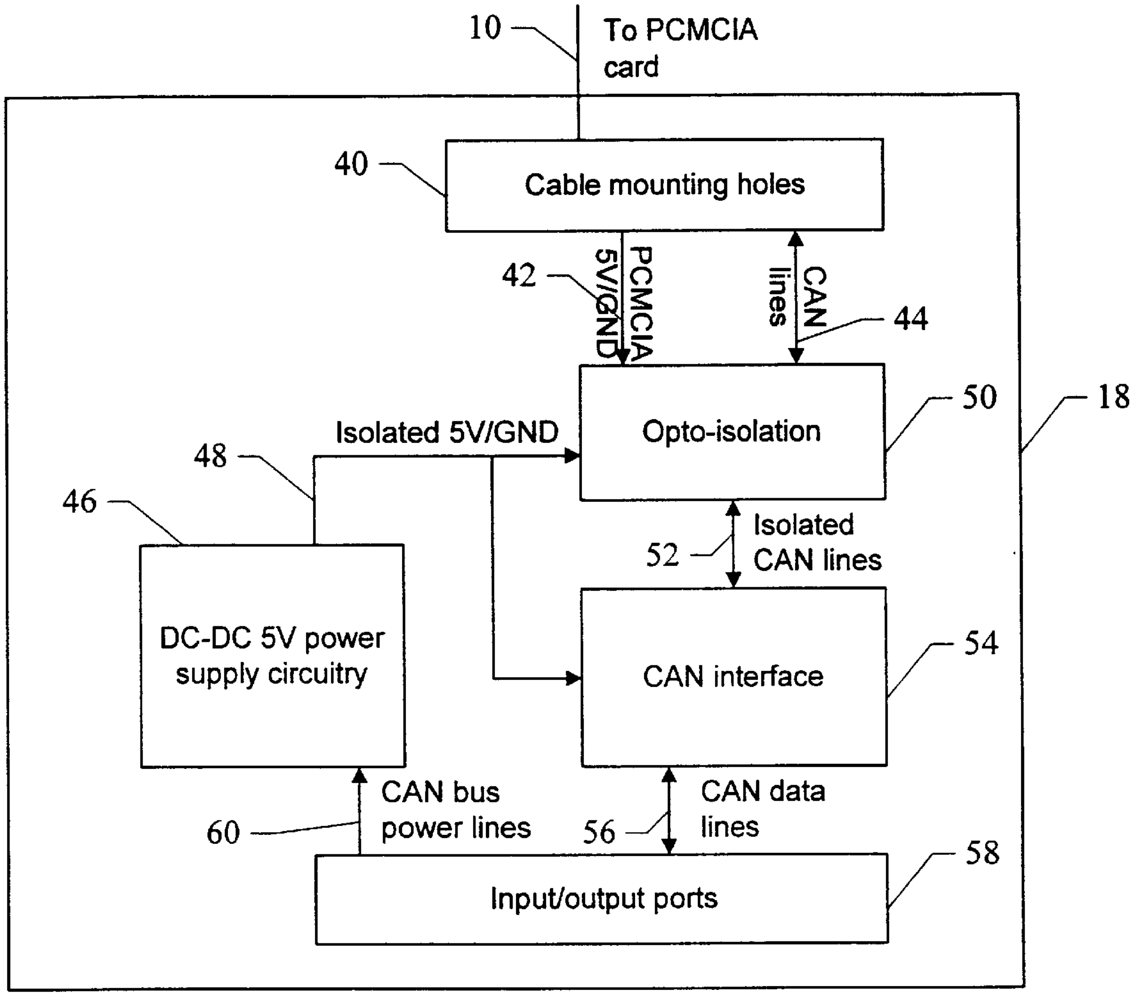
FIG. 7 shows schematic diagram of the circuitry inside the pod of a CAN bus cable which is bus powered.

FIG. 7 shows a schematic diagram of the circuitry inside pod 18 of second terminal 16. The circuitry shown here is for a CAN bus cable that is externally powered. In this embodiment, CAN interface 54 is powered by the serial instrumentation bus that is connected to input/output ports 58. Cable 10 is connected to pod 18 using cable mounting holes 40. Cable 10 provides 5V/ground power supply 42 and CAN lines 44 to a first section of opto-isolation 50. CAN bus power lines 60 are provided to isolated DC—DC 5V power supply circuitry 46 by the CAN serial instrumentation bus through input/output ports 58. Isolated DC—DC 5V power supply circuitry 46 provides isolated 5V/ground power supply 48 to a second section of opto-isolation 50 and to CAN interface 54. Isolated DC—DC 5V power supply circuitry 46 provides isolated 5V/ground power supply 48 which is electrically isolated from PCMCIA 5V/GND 42, i.e., electrical spikes present in CAN power lines 60 cannot propagate to PCMCIA 5V/ground 42.

Opto-isolation 50 receives CAN lines 44 and provides isolated CAN lines 52, which are electrically isolated from CAN lines 44. An electrical spike present in CAN lines 44 cannot propagate to isolated CAN lines 52. The operation of opto-isolation 50 is well-known in the art.

As a result of the electrical isolation, CAN interface 54 is supplied with isolated power and data lines. Thus, the CAN serial instrumentation bus that is connected to input/output ports 58 and provided with CAN data lines 56 is electrically isolated from the device that cable 10 is connected to. Therefore, the device is protected from any electrical spikes that may occur in the serial instrumentation bus, and the serial instrumentation bus is protected from any electrical spikes that may occur in the device.

According to the present invention, the cables of FIGS. 6 and 7 can be alternately used to power the serial instrumentation bus interface circuitry either from the computer or from the serial instrumentation bus. Thus, the cable of FIG. 6 is used to perform measurements on a serial instrumentation bus in an instrumentation system, wherein the serial instrumentation bus interface circuitry receives power from the computer system. The computer system provides power to the serial instrumentation bus interface circuitry comprised in the cable of FIG. 6. If the user desires to use a different CAN bus protocol which requires that the serial bus provide power, then the cable of FIG. 7 is used, i.e., the user replaces the cable of FIG. 6 with the cable of FIG. 7. The cable of FIG. 7 is thus used to perform measurements on the serial instrumentation bus, wherein the serial instrumentation bus interface circuitry receives power from the serial instrumentation bus. Thus the user can switch from a computer powered instrumentation application to a serial bus powered application merely by switching cables, i.e., without having to switch interface cards.

Figure 8:
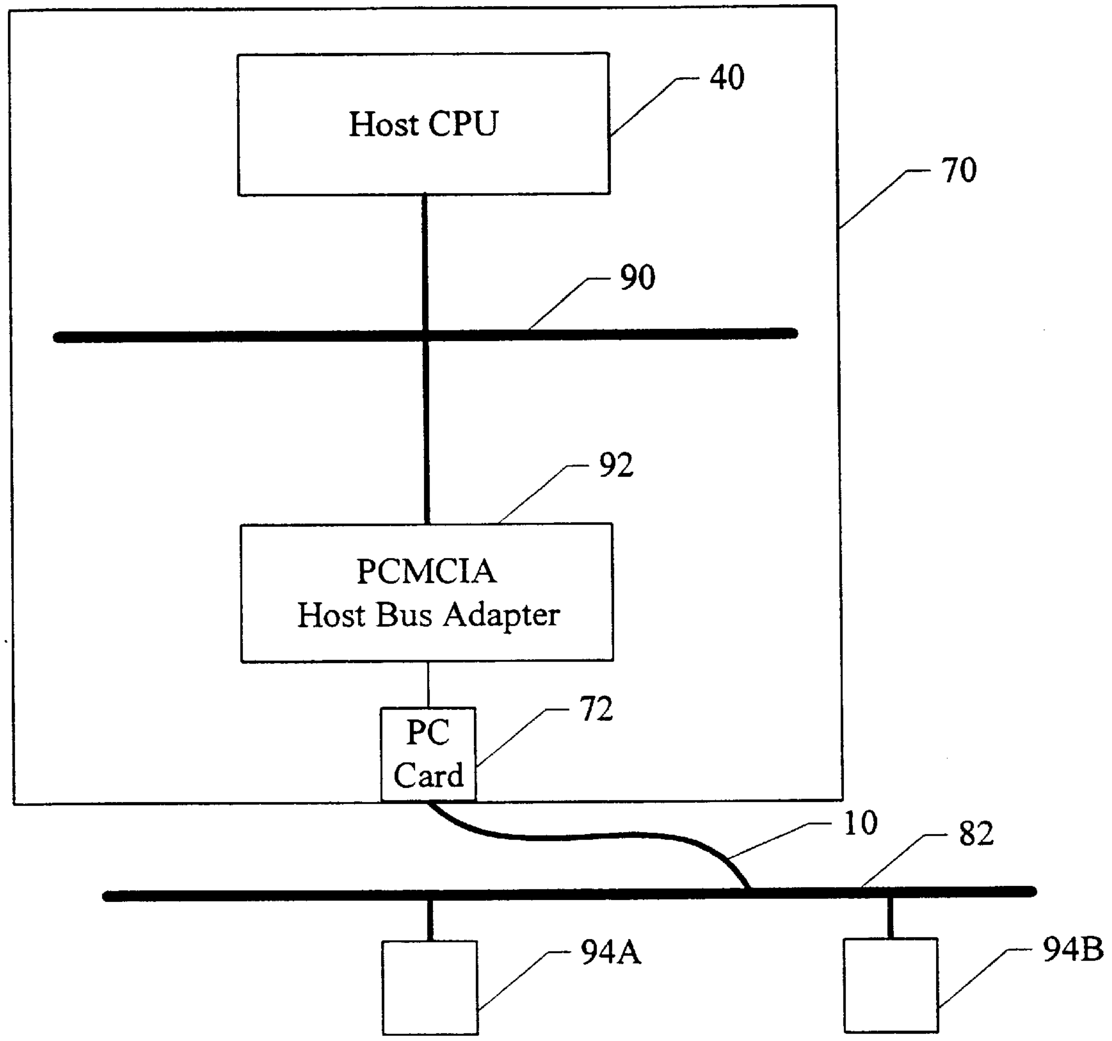
FIG. 8 shows a block diagram of a personal computer connected with a cable to a CAN bus or a Foundation fieldbus.

FIG. 8 shows a block diagram of a portable computer system connected to a serial instrumentation bus using a cable. Host CPU 40 of portable computer 40 is connected to internal bus 90 which is designed to provide an interface between peripheral components of computer 70. PC card 72 is connected to internal bus 90 through PCMCIA host bus adapter 92. PC card 72 is a plug-in card designed to provide additional functionality to portable computer 70.

Portable computer 70 interfaces with serial instrumentation bus 82 using cable 10. Cable 10 is designed to connect to PC card 72 and serial instrumentation bus 82. Host CPU 40 is thus operable to communicate with other devices that are coupled to serial instrumentation bus 82 such as devices 94A and 94B.

Figure 9:
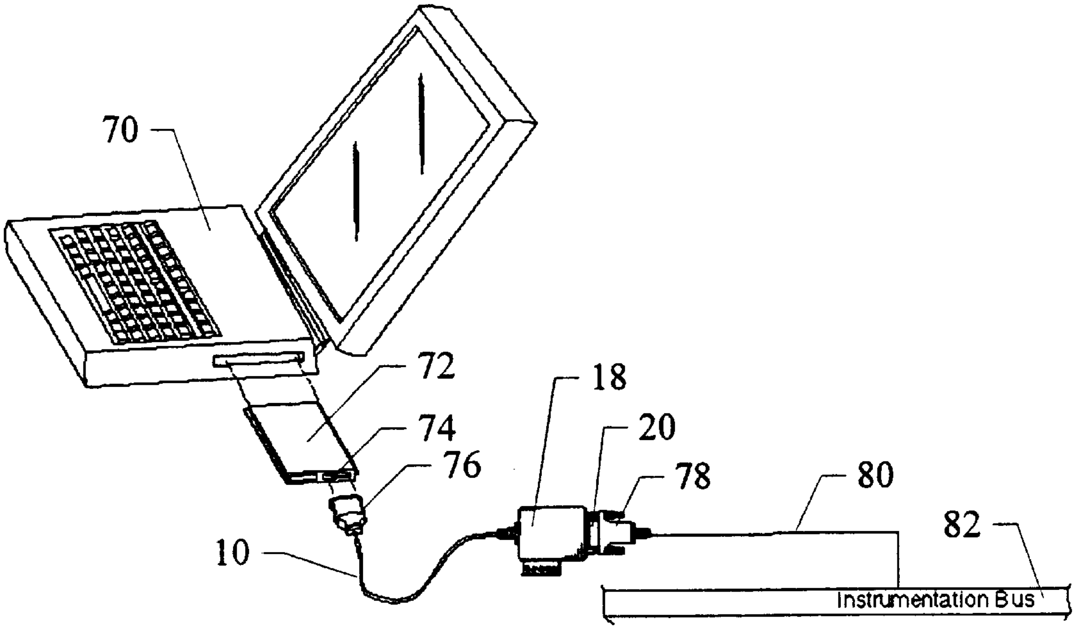
FIG. 9 shows a portable computer connected to an instrumentation bus using the 9-pin D-Sub connector.

In one embodiment shown in FIG. 9, a device such as portable computer 70 is connected to instrumentation bus 82 using first connector 20 of cable 10. First connector 20 is a 9-pin D-Sub connector designed to connect to mating connector 78 which is connected to instrumentation bus 82 with cable 80. Such a connection requires serial instrumentation bus 82 to have mating connector 78.

Figure 10:
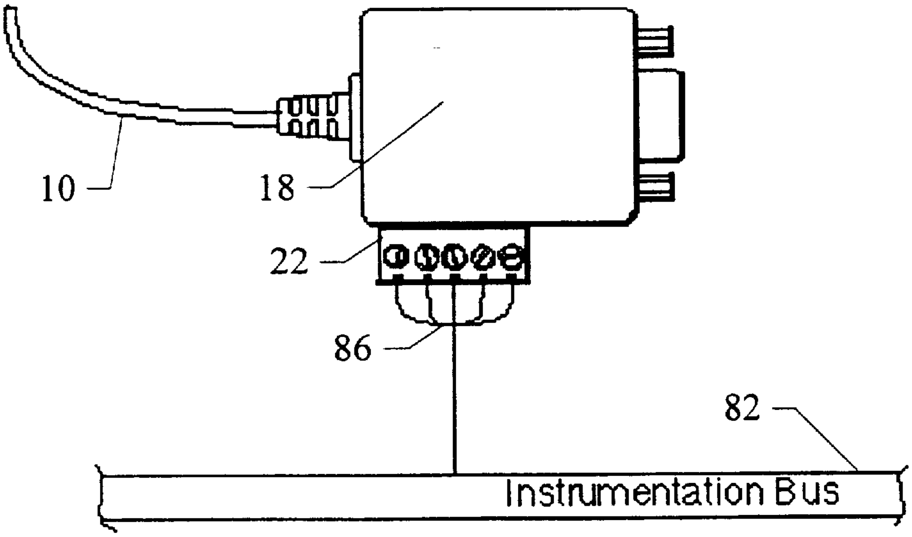
FIG. 10 shows a connection to an instrumentation bus using the 5-position pluggable screw terminal connector.

In another embodiment shown in FIG. 10, a device is connected to instrumentation bus 82 using second connector 22 of cable 10. Second connector 22 is a 5-position pluggable screw terminal connector which does not require serial instrumentation bus to have a special mating connector. Second bus connector 22 comprises wire receptors and bolts and can connect to five corresponding, stripped wires from instrumentation bus 82.

Figure 11:
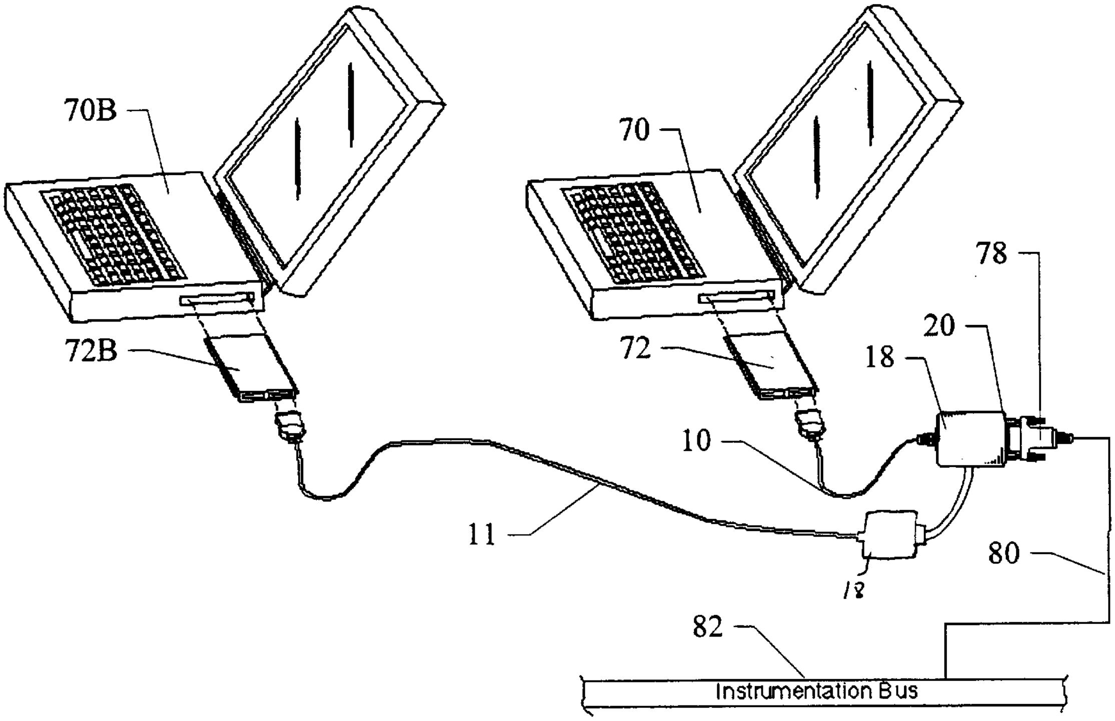
FIG. 11 shows a portable computer connected to an instrumentation bus with an additional portable computer being used as a bus monitor on the same bus.

In yet another embodiment shown in FIG. 11, two devices are connected to instrumentation bus 82 using cable 10 and second cable 11. In this embodiment, second device 70B, a portable computer with bus monitor software, is used to monitor activity on instrumentation bus 82. Device 70, also a portable computer, is connected to the instrumentation bus using cable 10 and first connector 20. Second device 70B is connected to instrumentation bus 82 using second cable 11 which connects to second connector 22 of cable 10. Both device 70 and device 70B are connected to instrumentation bus 82 using only one bus connection by utilizing the dual connector available on cable 10.

Figure 12:
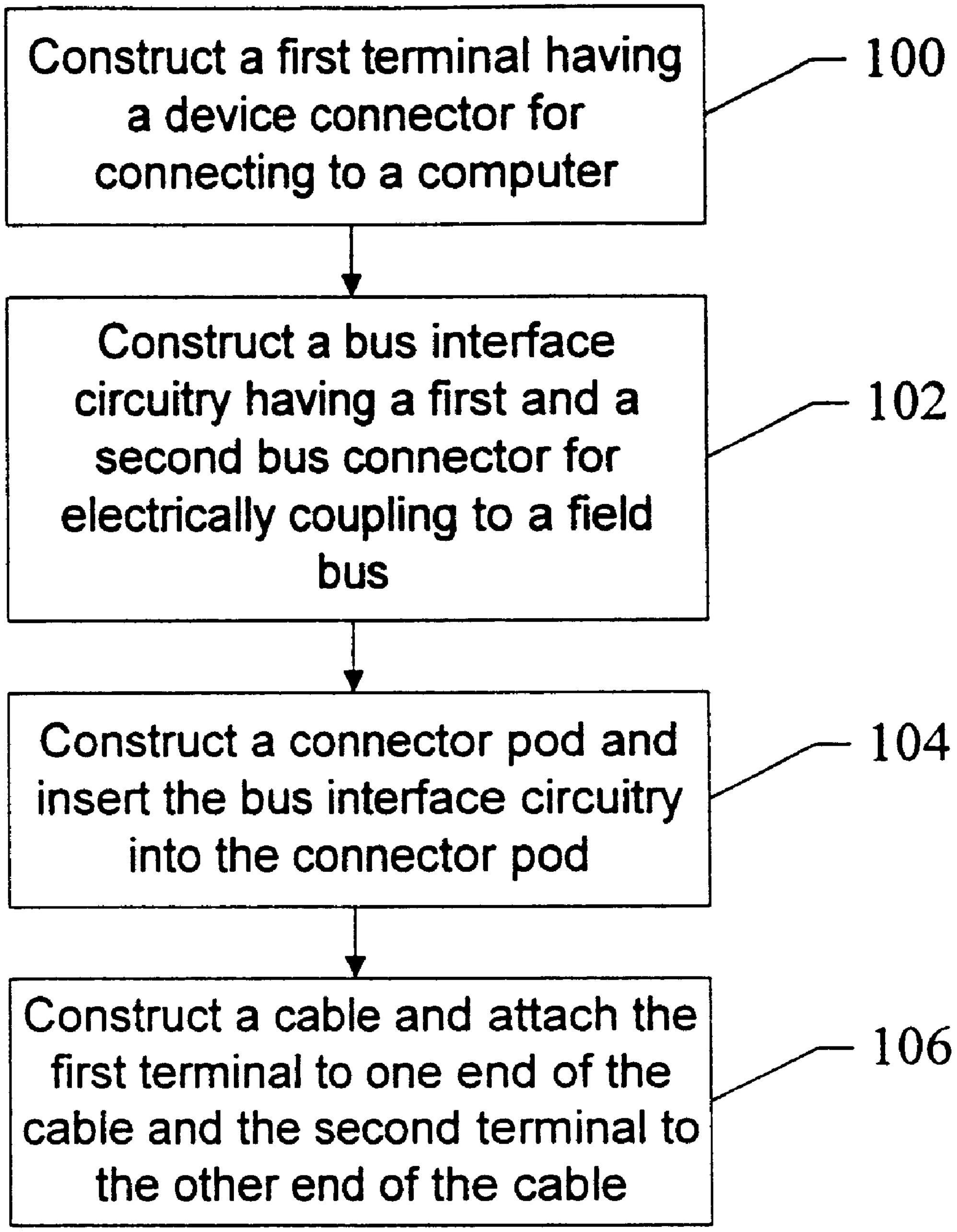
FIG. 12 shows a flowchart describing a method for constructing a cable for use with Foundation fieldbus and CAN bus.

The flowchart shown in FIG. 12 describes a method for constructing a cable for use with a Foundation fieldbus or CAN bus serial instrumentation bus. In step 100, a first terminal is constructed having a device connector for connecting to a computer. The device connector is a 15-position card I/O connector for connecting to a PCMCIA card of a portable computer. In step 102, a second terminal is constructed having fieldbus interface circuitry. The fieldbus interface circuitry is coupled to a first and a second bus connector for electrically coupling to a fieldbus, such as a CAN bus or a Foundation fieldbus.

In step 104, a connector pod is constructed and the fieldbus interface circuitry is inserted into the connector pod for interfacing with a serial instrumentation bus. In step 106, the cable is constructed by attaching the first terminal to one end of the cable and the second terminal to the other end of the cable.

Figure 13:
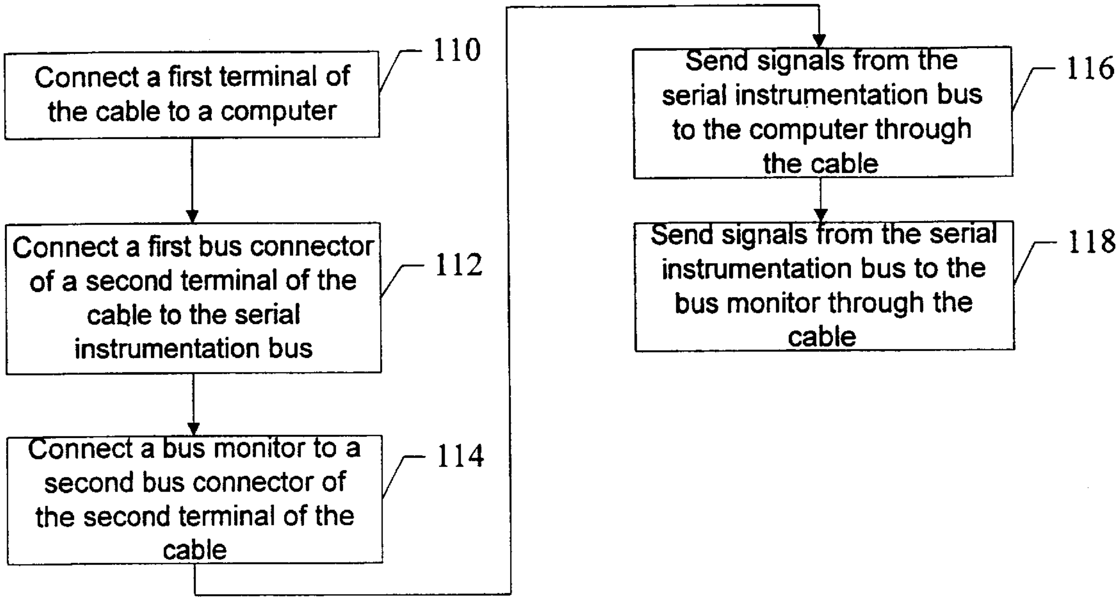
FIG. 13 shows a flowchart describing a method for controlling and monitoring a serial instrumentation bus using a dual connector cable.

The flowchart shown in FIG. 13 describes a method for controlling and monitoring a serial instrumentation bus using a dual connector cable. In step 110, a first terminal of the cable is connected to a computer. In the preferred embodiment, the first terminal is connected to a PCMCIA card of a portable computer. In step 112, a first bus connector of a second terminal of the cable is connected to a serial instrumentation bus. The instrumentation bus is either a CAN bus or a Foundation fieldbus.

In step 114, a bus monitor is connected to a second bus connector of the second terminal of the cable. In one embodiment, the bus monitor is another portable computer running software for monitoring signals on the serial instrumentation bus.

In step 116, signals are sent from the serial instrumentation bus to the computer through the cable. In step 118, signals are sent from the serial instrumentation bus through the cable.

We claim:

1. A cable for connecting a computer to a serial instrumentation bus, the cable comprising:

a first terminal located at a first end of the cable for coupling the cable to the computer, said first terminal comprising a device connector, wherein said device connector is configured to connect said first terminal to a connector on the computer; and a second terminal located at a second end of the cable for coupling the cable to the serial instrumentation bus, said second terminal comprising:

serial instrumentation bus interface circuitry for interfacing the cable with the serial instrumentation bus; and a first bus connector electrically coupled to said serial instrumentation bus interface circuitry which is configured to connect to a mating connector for coupling to said serial instrumentation bus; and a second bus connector electrically coupled to said serial instrumentation bus interface circuitry which is configured to connect to said serial instrumentation bus.

2. The cable of claim 1, wherein said first bus connector includes a first plurality of signal connectors, wherein said second bus connector includes a second plurality of signal connectors, and wherein said second plurality of signal connectors are electrically coupled to corresponding ones of said first plurality of signal connectors.

3. The cable of claim 1, wherein said first bus connector is useable for a first type of serial instrumentation bus, and wherein said second bus connector is useable for a second type of serial instrumentation bus.

4. The cable of claim 1, wherein said serial instrumentation bus is a fieldbus, wherein said serial instrumentation bus interface circuitry comprises fieldbus interface circuitry.

5. The cable of claim 4, wherein said first bus connector is useable for a first type of fieldbus, and wherein said second bus connector is useable for a second type of fieldbus.

6. The cable of claim 4, wherein said serial instrumentation bus is a Foundation fieldbus.

7. The cable of claim 4, wherein said serial instrumentation bus is a CAN bus.

8. The cable of claim 1, wherein said first bus connector is operable to be connected to said serial instrumentation bus, wherein said second bus connector is operable to be connected to a bus monitor to enable said bus monitor to monitor signals on said serial instrumentation bus.

9. The cable of claim 1, wherein said first bus connector is a 9-pin D-Sub connector.

10. The cable of claim 1, wherein said second bus connector is a pluggable screw terminal connector.

11. The cable of claim 1, wherein said device connector is adapted for coupling to a PC Card.

12. The cable of claim 1, wherein said serial instrumentation bus is a CAN bus;

wherein the CAN bus includes a protocol chosen from the group consisting of DeviceNet, CANopen, and SDS, and wherein said circuitry is designed to allow the cable to operate under a CAN industrial protocol chosen from the group consisting of DeviceNet, CANopen, and SDS.

13. The cable of claim 1, wherein said circuitry comprises optical isolators for providing signal isolation to the computer system.

14. A method of constructing a cable for use with fieldbus buses, the method comprising:

constructing a first terminal for coupling the cable to a computer, said first terminal comprising a device connector, wherein said device connector is configured to connect said first terminal to a connector on the computer;

constructing a bus interface circuitry comprising a first bus connector and a second bus connector, wherein the first bus connector is adapted for electrically coupling to one or more types of fieldbus buses, wherein the second bus connector is adapted for electrically coupling to one or more types of fieldbus buses, wherein said bus interface circuitry comprises fieldbus interface circuitry;

constructing a connector pod, wherein said connector pod comprises the bus interface circuitry;

wherein said constructing the connector pod creates a second terminal;

constructing the cable;

attaching said first terminal to a first end of the cable; and attaching said second terminal to a second end of the cable.

15. The method of claim 14, further comprising:

constructing Foundation fieldbus interface circuitry for interfacing to a Foundation fieldbus;

constructing CAN bus interface circuitry for interfacing to a CAN bus.

16. A method for controlling and monitoring a serial instrumentation bus using a dual connector cable, wherein the dual connector cable comprises a first terminal located at a first end of the cable for coupling the cable to a computer, and a second terminal located at a second end of the cable for coupling the cable to the serial instrumentation bus, said second terminal comprising serial instrumentation bus interface circuitry, said second terminal also including first and second bus connectors each for electrically coupling to said serial instrumentation bus, the method comprising:

connecting the first terminal of the cable to a computer;

connecting the first bus connector of the second terminal to the serial instrumentation bus;

connecting a bus monitor to the second bus connector of the second terminal, wherein the bus monitor is electrically coupled to the serial instrumentation bus through the second bus connector;

the computer receiving signals from the serial instrumentation bus through the cable, wherein the signals from the serial instrumentation bus are received through the first bus connector; and the bus monitor receiving signals from the serial instrumentation bus through the cable, wherein the signals from the serial instrumentation bus are received through the second bus connector.

17. The method of claim 16, wherein the serial instrumentation bus comprises a fieldbus bus.

18. The method of claim 17, wherein the serial instrumentation bus comprises a Foundation fieldbus.

19. The method of claim 17, wherein the serial instrumentation bus comprises a CAN bus.

20. The method of claim 16, wherein said first bus connector includes a first plurality of signal connectors, wherein said second bus connector includes a second plurality of signal connectors;

wherein said second plurality of signal connectors are electrically coupled to corresponding ones of said first plurality of signal connectors.

21. A cable for connecting a device to a data bus, the cable comprising:

a first terminal for coupling the cable to the device, said first terminal comprising:

a device connector, wherein said device connector is configured to connect said first terminal to said device; and a second terminal for coupling the cable to the data bus, said second terminal comprising:

circuitry for interfacing the cable with the data bus; and at least a first bus connector and a second bus connector, wherein said first bus connector is configured to connect said second terminal to said data bus requiring said first bus connector and wherein said second bus connector is configured to connect said second terminal to said data bus requiring said second bus connector.

22. A method of performing measurements on a serial instrumentation bus in an instrumentation system, wherein the instrumentation system comprises a computer including an interface card and the serial instrumentation bus, the method comprising:

connecting a first cable between the interface card in the computer and the serial instrumentation bus, wherein said connecting comprises connecting a first terminal located at a first end of the first cable to the interface card in the computer, and connecting a second terminal located at a second end of the first cable to the serial instrumentation bus, wherein said second terminal comprises first serial instrumentation bus interface circuitry for interfacing the first cable with the serial instrumentation bus, wherein said first serial instrumentation bus interface circuitry is adapted to receive power from the serial instrumentation bus;

the serial instrumentation bus providing power to the first serial instrumentation bus interface circuitry comprised in the first cable;

performing one or more measurements which are transferred through the first cable;

disconnecting the first cable;

connecting a second cable between the interface card in the computer and the serial instrumentation bus, wherein said connecting comprises connecting a first terminal located at a first end of the second cable to the interface card in the computer, and connecting a second terminal located at a second end of the second cable to the serial instrumentation bus, wherein said second terminal comprises second serial instrumentation bus interface circuitry for interfacing the second cable with the serial instrumentation bus, wherein said second serial instrumentation bus interface circuitry is adapted to receive power from the interface card;

the interface card providing power to the second serial instrumentation bus interface circuitry comprised in the second cable; and performing one or more measurements which are transferred through the second cable.

* * * * *